(12) United States Patent
Ferianz et al.

(10) Patent No.: US 7,084,677 B2
(45) Date of Patent: Aug. 1, 2006

(54) LINE DRIVER

(75) Inventors: Thomas Ferianz, Bodensdorf (AT);
Christian Fleischhacker, Pischeldorf (AT); Dario Giotta, Villach (AT);
Rüdiger Koban, Krumpendorf (AT);
Thomas Pötscher, Graz (AT); Andreas Wiesbauer, Pörtschach (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/788,667

(22) Filed: Feb. 27, 2004

(65) Prior Publication Data

US 2004/0232953 A1 Nov. 25, 2004

(30) Foreign Application Priority Data

Feb. 28, 2003 (DE) ................. 103 08 946

(51) Int. Cl.
*H03K 3/00* (2006.01)
(52) U.S. Cl. .................. 327/108; 327/110; 326/82; 326/83
(58) Field of Classification Search ................ 327/108, 327/109, 110; 326/82, 83, 86, 87, 91
See application file for complete search history.

(56) References Cited

U.S. PATENT DOCUMENTS

| 4,224,671 A | * | 9/1980 | Sugiyama et al. ............ 702/60 |
| 5,677,962 A | * | 10/1997 | Harrison et al. ............ 381/109 |
| 6,166,596 A | * | 12/2000 | Higashiyama et al. ......... 330/10 |
| 6,396,933 B1 | * | 5/2002 | Jung et al. ................ 381/96 |
| 6,441,866 B1 | * | 8/2002 | Chen et al. ................. 348/606 |
| 6,480,067 B1 | * | 11/2002 | Kobayashi et al. ......... 330/279 |
| 6,570,444 B1 | * | 5/2003 | Wright ....................... 330/149 |
| 6,741,123 B1 | * | 5/2004 | Andersen et al. ............. 330/10 |
| 6,853,325 B1 | * | 2/2005 | Arizumi et al. ............. 341/152 |
| 6,919,771 B1 | * | 7/2005 | Nakajima ................... 332/109 |
| 6,933,778 B1 | * | 8/2005 | Olson et al. ................. 330/10 |
| 2003/0142816 A1 | | 7/2003 | Koban |

FOREIGN PATENT DOCUMENTS

| DE | 100 38 373 C2 | 9/2002 |
| EP | 1 014 571 A2 | 6/2000 |
| JP | 57-171810 | 10/1982 |

* cited by examiner

*Primary Examiner*—Tuan T. Lam
*Assistant Examiner*—Hiep Nguyen
(74) *Attorney, Agent, or Firm*—Maginot Moore & Beck

(57) ABSTRACT

The invention relates to a line driver arrangement for driving signals via at least one subscriber line, provided with:
  an input for injecting an input signal and having an output at which a signal which is to be driven via the subscriber line can be tapped off,
  a digital amplifier which produces a pulse-width-modulated signal on the output side from the input signal or from a signal derived from it,
  an analog amplifier, which produces an analog signal on the output side from the input signal or from a signal derived from it,
  with the outputs of the amplifiers being coupled such that the signal to be driven results from superimposition of the analog signal and the digital signal,
  with the gain of the analog amplifier being matched to the gain of the digital amplifier such that scatter and/or overshoot on the digital signal are at least reduced after the superimposition.

25 Claims, 6 Drawing Sheets

LINE DRIVER

FIELD OF INVENTION

The invention relates to a line driver arrangement for driving signals via at least one subscriber line.

BACKGROUND

High bit rate data transmission on a subscriber line is of very major importance in modern telecommunications, where there is a need to transmit both speech and data signals via the respective subscriber lines in the telephone network.

This is achieved by means of so-called xDSL technology, where DSL is short for "digital subscriber line". With this technique, the telecommunications line, which is typically composed of copper, is subdivided into at least two different channels. As before, one of these channels is available for the conventional telephone services, that is to say for speech transmission (POTS, plain old telephone service). At least one second channel is used for data transmission.

One known representative of xDSL technology is the so-called ADSL technique ("asymmetric digital subscriber line"), which refers to a technique which allows a high bit rate bit stream to be transmitted from a control center to the subscriber, and allows a low rate bit stream from the subscriber to the control center. Since this transmission technique uses an asymmetrical bit rate, an ADSL system is particularly highly suitable for services such as video on demand, or else for Internet applications.

The ADSL method is a digital transmission method for typically twisted two-wire lines in the telephone network to the end subscriber for broadband applications. A digital signal processor (DSP) is provided for each channel, and is operated using a relatively low supply voltage of, for example, +5 V. In order to allow the signals to be transmitted at an adequate signal strength via the subscriber lines, each of the signal processors is followed by line driver circuits. A line driver circuit such as this is, in the simplest case, an amplifier which transmits the signal to be transmitted on the subscriber line with the necessary gain, since losses in the signal to be transmitted always have to be taken into account as well, during signal transmission.

These line driver circuits are subject to very stringent linearity and signal bandwidth requirements, particularly in the channel for data signal transmission, but also in the speech signal channel.

A further problem results from the fact that the amplification of the signal very frequently results in the signal to be transmitted being distorted.

There are already a large number of different circuit variants for providing a line driver circuit, some of which will be described briefly in the following text:

A Class AB amplifier is described in the article by Michael S. Kappes, "A 3-V CMOS Low-Distortion Class AB Line Driver Suitable for HDSL Applications", IEEE JSSC, Vol. 35, No. 3, March 2000. An amplifier such as this has a relatively low efficiency of about 15% when used for ADSL, which leads to an increased power consumption in the range from 800 mW to 1 W. In order to now achieve the required gain linearity, this amplifier has to use a current which is as small as possible, although this would mean that the capability to reduce the supply voltage between the line driver and the downstream transformer is restricted. This is associated with an increase in the electrostatic charge (ESD), resulting in problems from overheating of the transformer. There may also be problems involved with technology transfer.

Furthermore, Class G amplifiers are also known, and their design and method of operation are described, for example, in the article by J. Pierdomenico, et al. "A 744 mW Supply Full-Rate ADSL CO Driver", ISSCC 20/2, Session 19, pages 320 et seq, 2002. The efficiency of a Class G amplifier such as this is better than that of a Class AB amplifier, and this also leads to a reduced power consumption. This is because, in the case of signals with a high crest factor (Peak-to-Average Ratio=PAR), the mean output voltage is very much lower than the maximum of the output voltage. However, this is offset by very severe distortion of the transmitted signal, owing to the very frequent supply voltage switching processes that occur with this amplifier class. Furthermore, this amplifier class is very much less efficient, particularly when the transmitted signals have a low crest factor. Since, however, future systems will operate with reduced crest factors, this problem will become increasingly important in the near future.

Furthermore, Class D amplifiers also exist, which operate as PWM modulator circuits (Pulse Width Modulator). One representative of this amplifier class is, for example, described in the article by Jae H. Jeong et. al. "A Class D Switching Power Amplifier with High Efficiency and Wide Bandwidth by Dual Feedback Loops", IEEE International Conference on Consumer Electronics (ICE '95), pages 428 et seq, 1995. Class D amplifiers admittedly have a very high efficiency in the range from 80 to 90%, but this is at the expense of very wide scatter.

In order to reduce the scatter, and hence to improve the linearity, feedback circuits are known, but these generally lead to the stability of the overall circuit being relatively poor. One such circuit with feedback is described, for example, in the Korean Patent Application No. 96/37905. A further problem associated with Class D amplifiers results from their very high switching speed. In particular, the switching speed is very much higher than the changes in the mathematical signs in the signal to be transmitted, so that amplifiers such as these are relatively unsuitable for high-speed transmission such as ADSL, since the dynamic losses rise in proportion to the switching frequency.

The already known amplifier circuits for line drivers are therefore subject to the problem that none of these amplifier circuits achieves high linearity and thus high efficiency in the signal to be transmitted with very low scatter at the same time.

SUMMARY

Against the background of the prior art as described above, the present invention is thus based on the object of specifying a line driver arrangement which produces a signal to be transmitted not only with high linearity and thus high efficiency but at the same time also with as little scatter as possible.

According to one aspect of the disclosure, a line driver arrangement is provided for driving signals via at least one subscriber line, having:
  an input for injecting an input signal and having an output at which a signal which is to be driven via the subscriber line can be tapped off,
  a digital amplifier which produces a pulse-width-modulated signal on the output side from the input signal or from a signal derived from it, an analog amplifier, which produces an analog signal on the output side from the input signal or from a signal derived from it, with the outputs of the amplifiers being coupled such that the signal to be driven results from superimposition of the analog signal and the digital signal, with the gain of the analog amplifier being matched to the gain of the digital amplifier such that scatter and/or overshoot on the digital signal are at least reduced after the superimposition.

Advantageous refinements and improvements can be found in the description, with reference to the drawings.

The idea on which the present invention is based is to combine the functionalities of a known Class D amplifier with those of a Class AB amplifier such that both high linearity and high efficiency are achieved for the signal to be transmitted. The invention is thus based on the knowledge that digital Class D amplifiers have very poor linearity but very good efficiency. These digital amplifiers are used to produce virtually all of the power for the signal to be transmitted on the subscriber line, although the signal to be transmitted thus has poor linearity. The analog Class A or AB amplifier, on the other hand, has poor efficiency, but very good linearity. This analog amplifier is in this case linked to the digital amplifier such that the severely distorted signal from the digital amplifier is, so to speak, cleaned up. A signal to be transmitted with high linearity and high efficiency, that is to say low scatter, is thus produced on the output side.

The functions of the two amplifiers are controlled by means of a control device.

This advantageous linking of the functionalities of the analog and digital amplifier is achieved, according to the invention, in at least two different ways:

Firstly, the analog and digital amplifiers can be arranged in parallel with one another in the subscriber line. In this case, the signals which are produced on the output side by the two amplifiers are superimposed on one another after being transformed in each case. The amplified signal which is produced on the output side in this way is transmitted via the subscriber line. This has the particular advantage that is actually this signal to be transmitted which is at the same time fed via a feedback loop with negative feedback into the input of the analog amplifier. This feedback path, which is provided only in the analog path of the driver circuit, is intended to compensate for the scatter that is inherent in the signal on the output side, as follows. Any scatter which may be present in the output signal and which reduces the linearity on the output side is fed back via the feedback path, and is superimposed on the signal on the input side. The difference between this signal and the fed-back signal thus represents a measure of the scatter. The negative feedback thus effectively results in a control loop with negative feedback.

As an alternative to arranging the analog and digital amplifiers in parallel, these may also, for example, be arranged in series with one another, with the digital amplifier being downstream from the analog amplifier. The output signal from the analog amplifier is supplied on the one hand directly and on the other hand via a resistance network and via the digital amplifier to the output of the line driver. These two output signals are superimposed on one another and are transmitted via the subscriber line, via a transformer. This output signal to be transmitted still does not have sufficient linearity, however. For this purpose, the line driver circuit is equipped with negative feedback, in which the superimposed output signal from the two amplifiers has the input signal of the analog amplifier superimposed on it via a feedback path with negative feedback. This overcomes the scatter in the output signal that is to overhang, by compensation for the waves and jagged elements in the output signal from the digital amplifier.

The invention will be explained in more detail in the following text with reference to the exemplary embodiments which are illustrated in the drawing, in which, in this case:

BRIEF DESCRIPTION OF THE DRAWING

Identical and functionally identical elements and signals are identified in the same way—unless stated to the contrary—in all of the figures of the drawing.

DETAILED DESCRIPTION

Figure 1:
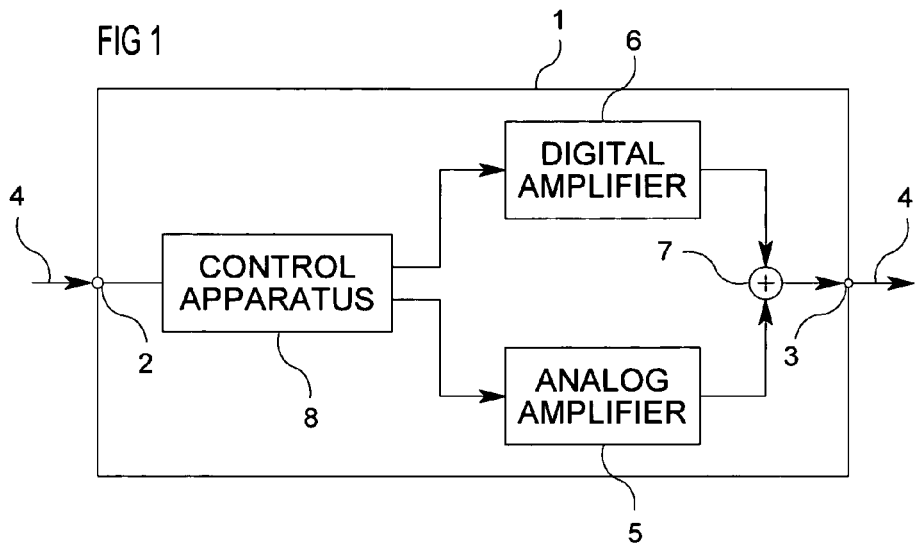
FIG. 1 shows a block diagram of the general configuration of a line driver circuit according to the invention.

FIG. 1 uses a block diagram to show the basic principle of a line driver according to the invention. The line driver is in this case annotated by the reference symbol 1. The line carrier 1 has an input 2 and an output 3, and is arranged in a subscriber line 4. The line driver 1 has an analog amplifier 5 and a digital amplifier 6, whose output signals are linked to one another in a unit 7 which is provided specifically for this purpose. A control unit 8 is also provided, in order to control the two amplifiers 5, 6.

The digital amplifier 6 produces the power or the energy for data transmission, the analog amplifier 5 improves the linearity and, depending on the implementation, a more or less complex control network 8 is provided, in order to drive the two amplifiers 5, 6. Two of these implementations will be described in detail in the following text with FIGS. 2–8.

Figure 2:
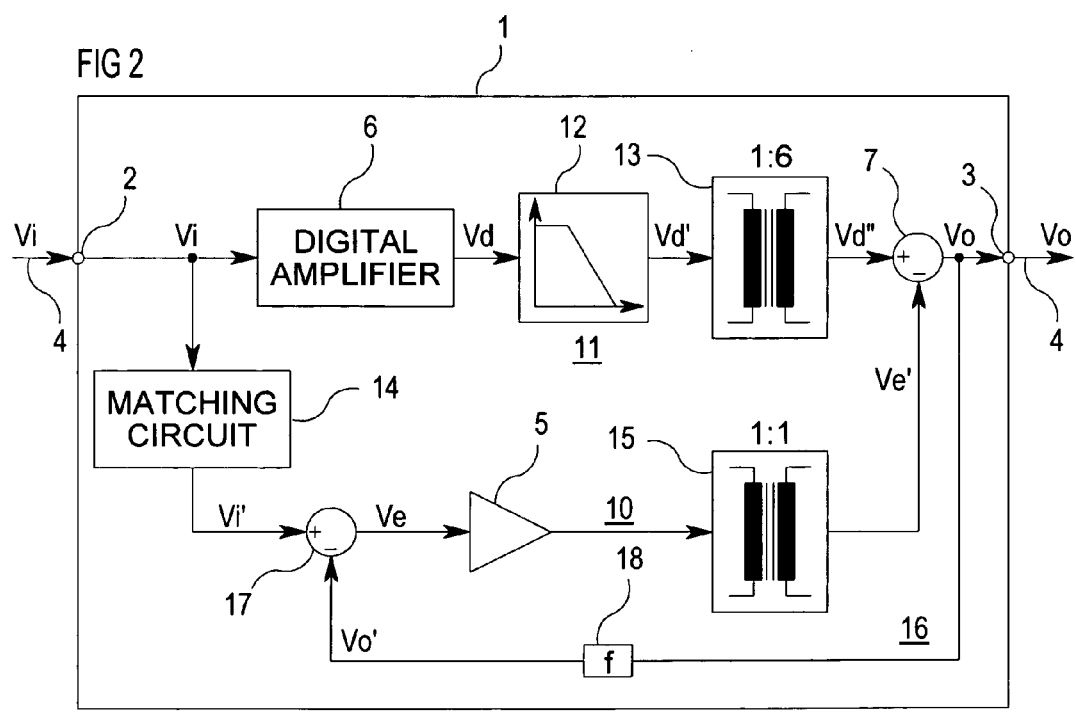
FIG. 2 shows the block diagram of a first line driver circuit according to the invention.

FIG. 2 shows the block diagram of a first line driver arrangement according to the invention. The line driver 1 in this case contains an analog path 10 and a digital path 11, which are arranged in parallel with one another between the input 2 and the output 3. The digital path 11 has a digital amplifier 6, a filter 12 and a transformer 13, arranged in series with one another. The analog path 10 has a matching circuit 14, an analog amplifier 5 and a second transformer 15 arranged in series with one another.

The input signal Vi, which is injected via the input 2, is first of all injected into the digital amplifier 6 in digital path 11, and this digital amplifier 6 converts this signal to a pulse-width-modulated signal Vd, which can be tapped off on the output side of the digital amplifier 6. The digital amplifier 6 thus produces the power which is required for data transmission. This PWM signal Vd is then filtered in the filter 12, which is typically a low-pass filter, and is supplied to the primary side of the first transformer 13. The transformer 13 uses the digital, filtered PWM signal Vd' to produce an analog signal Vd" which can be tapped off on the secondary side of the transformer 13. This analog signal in the ideal case forms the output signal Vo which is to be transmitted via the subscriber line 4.

Furthermore, the input potential Vi is first of all supplied to the matching circuit 14 in the analog path 10. The potential Vi' which is produced on the output side of the matching circuit 14 is supplied to the input Ve of the analog amplifier 10. The output signal from the analog amplifier 5 is transformed via a second transformer 15, and is supplied to the output 3 of the line driver 1. The unit 7 for linking the output signals from the analog path 10 and from the digital path 11 is provided there for this purpose, so that the signal Ve' which is produced from the analog path 10 has the output signal Vd" from the digital path 11 superimposed on it, with a negative mathematical sign. The result of this superimposition forms the analog output potential Vo.

In addition, a feedback path 16 is provided. The output signal Vo can be fed back with negative feedback to the input of the analog amplifier 5 via this feedback path 16. The feedback path 16 has a divider 18 with a feedback factor f. The analog output signal Vo is thus converted via this feedback factor f to a signal Vo' which is derived from it and has the input signal Vi' superimposed on it, with a negative mathematical sign, in the unit 17. The signal Ve which is obtained from this superimposition is injected into the input side of the analog amplifier 5. This results in a control loop with negative feedback.

The matching circuit 14 is used for the purpose of matching the phase and amplitude of the signal Vo' which is fed back via the feedback path 16, on the input signal Vi'. Without this matching circuit 14, the analog amplifier 10 would be overloaded. This matching is required because only a signal which is derived from the output signal Vo and which has only the scatter in the output signal Vo, but not any other scatter, is intended to be provided as the feedback signal Vo'. If no such matching circuit 14 were provided, then the control loop for regulating out any scatter in the output signal Vo will be very much less effective, and this would lead to reduced linearity in the output signal Vo.

In one basic implementation, the matching circuit 14 could be in the form of a simple low-pass filter. In addition, a functional unit for trimming may also be implemented, in order to improve the accuracy of this matching process.

The method of operation of the line driver arrangement 1 according to the invention will be described in more detail in the following text with reference to FIG. 2:

The high scatter in the digital path 11, which is caused by the digital amplifier 6, results in an output signal Vout which has undesirable scatter. The output voltage Vout of the output 3 is thus:

$$Vout = Vo + THD, \quad (1)$$

where THD denotes the harmonics that are superimposed on the simple signal. This output signal Vout is at the same time compared with the input signal Vi' via the feedback path 16, in which it is divided by the feedback factor f. As a result of this comparison, the comparator 17 produces an error signal Ve, which is injected into the analog amplifier 5. In the ideal case, in which there is no delay in the digital path 11 and no matching is provided or required in the circuit 14, then Vi'=Vi. The error signal Ve thus becomes:

$$Ve = Vi - \frac{Vout}{f} = Vi - \frac{Vo + THD}{f} = Vi - \frac{Vo}{f} - \frac{THD}{f} \quad (2)$$

If the error factor f is chosen as follows:

$$f = \frac{Vo}{Vi'} \quad (3)$$

then the error signal Ve becomes:

$$Ve = -\frac{THD}{f} \quad (4)$$

For the situation where the analog amplifier 5 is an inverting amplifier which has very high gain in the region of the feedback factor f, then a transformation ratio in the transformer 15 of 1:1 for the output signal Ve' results in:

$$Ve' = -THD \quad (5)$$

If the output signals Vout, Ve' from the digital path 11 and the analog path 10 are superimposed, this results in the ideal case, on the basis of the assumptions made above, in the scatter in the output signal being corrected completely.

However, in reality, there is always a certain time delay in the digital path 11, so that a constellation according to equation (3) is in practice not feasible. For these reasons, a matching circuit 14 is advantageously provided, which uses the input signal Vi to produce an output signal Vi' such that the equation (3) is very largely satisfied. At the same time, this means that the phase and magnitude of the output signals Vo and Ve' are optimally matched to one another. However, this is never entirely possible in reality, and in fact there is always still a certain mismatch. According to equation (2), a mismatch such as this would add to the original scatter. However, this would result in the problem that the analog amplifier 5 would interpret this mismatch as scatter caused in the digital amplifier 6, and would thus attempt to correct it in the output signal Vout. The error signal Ve thus becomes:

$$Ve = mism. - \frac{THD}{f} \quad (6)$$

so that, even in the ideal case in which the scatter has been corrected completely, the mismatch in the output signal Vout is evident as follows:

$$Vout = Vo + mism.*f \quad (7)$$

For these reasons, it is very important for an output signal Vout which is very largely free of scatter and thus of the best possible linearity, to match the two signals in the analog and digital paths 10, 11 as well as possible.

Figure 3:
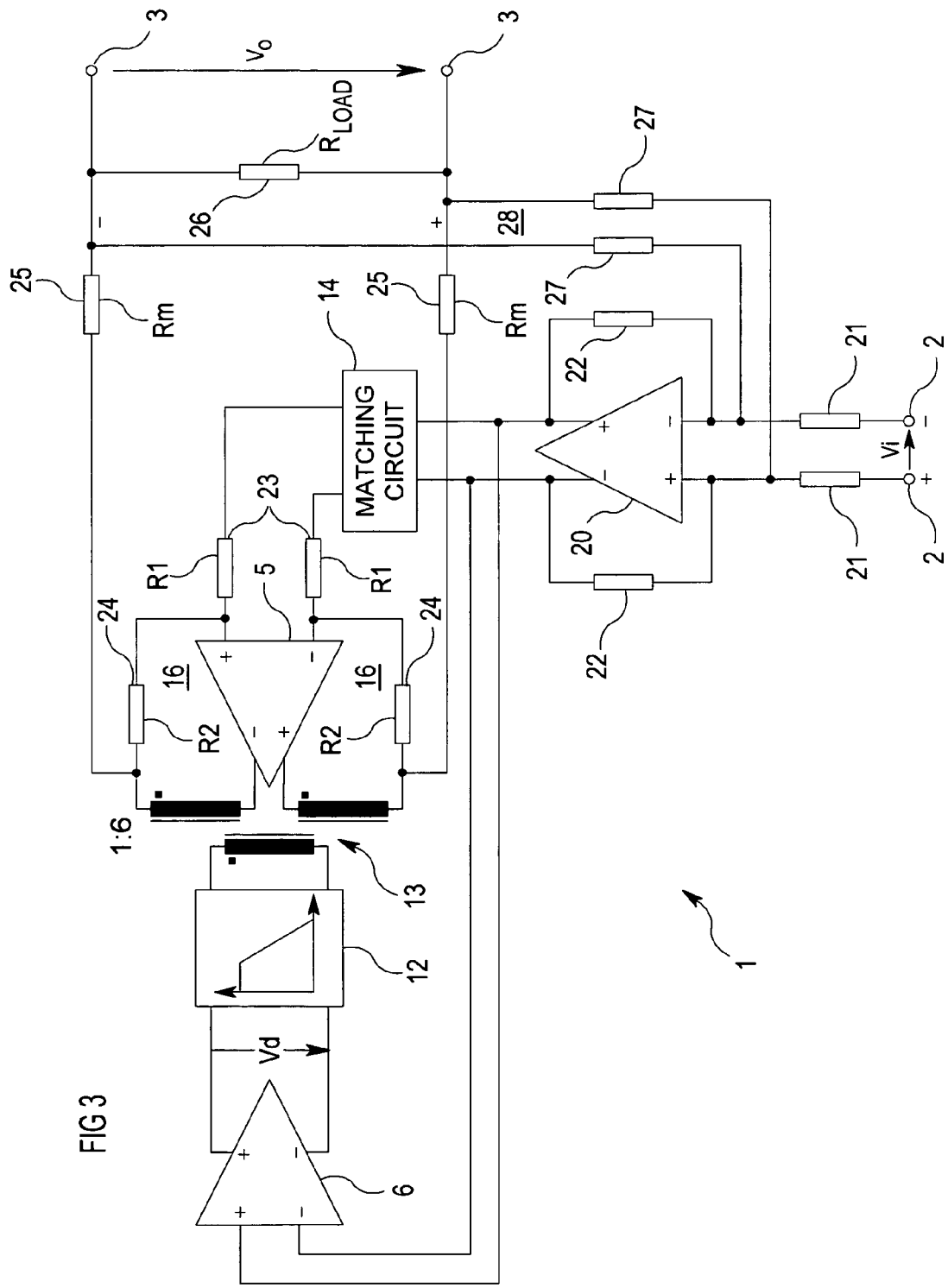
FIG. 3 shows a detailed circuit diagram for the line driver circuit corresponding to that in FIG. 2.

FIG. 3 shows a more detailed exemplary embodiment for the implementation of a line driver 1 as shown in FIG. 2. In the example in FIG. 3, it is assumed that the line driver 1 is designed to amplify an ADSL signal via the subscriber line 4. The subscriber line which, for example, is a typical two-wire telephone line, has, for example, an impedance of 100 Ohms, with the normal tolerances on this. The maximum amplitude of the ADSL signal would therefore be about 18 V. The signal to be transmitted is a multitone signal comprising 256 individual tones in the frequency band between 138 kHz and 1.1 MHz, with a frequency separation between adjacent tones of about 4 kHz, which is obtained from the quadrature amplitude modulation (QAM). The crest factor which results from this is then up to 6.

The line driver 1 as shown in FIG. 3, which is in the form of a buffer amplifier, has an additional preamplifier 20, whose input side is connected to the inputs 2 and whose output side is arranged upstream of the digital path 11 and analog path 10. Pesistors 21 are connected upstream of the differential inputs of the preamplifier 20. Furthermore, resistors 22 are provided to bridge the inputs and outputs of the preamplifier 20.

In the digital path 11, the preamplifier 20 is followed by the digital amplifier 6 and the filter 12.

Figure 4:
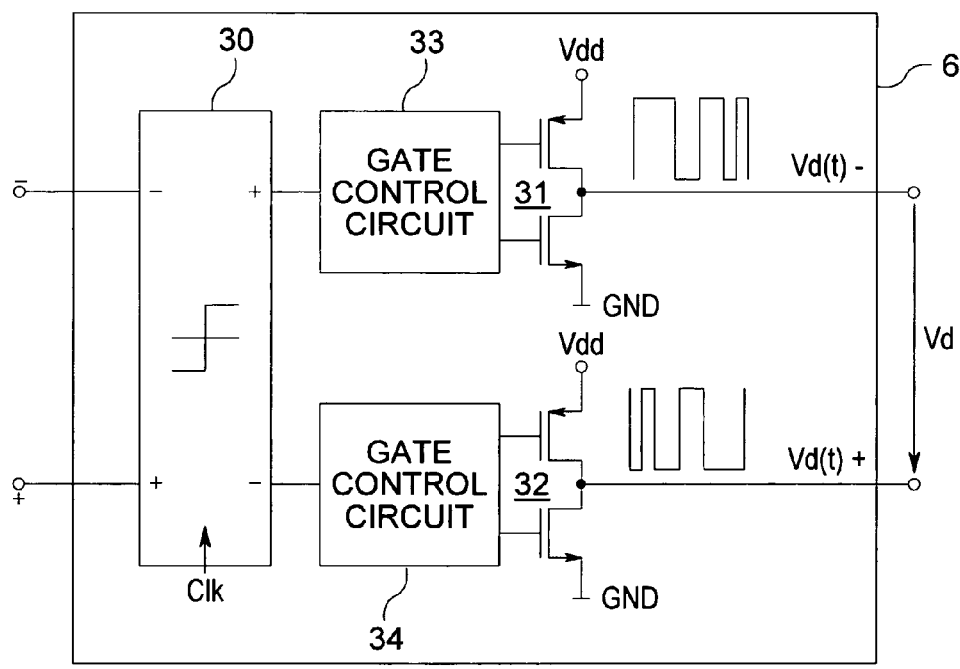
FIG. 4 shows a block diagram of one refinement of the digital amplifier as shown in FIGS. 2 and 3.

FIG. 4 uses a block diagram to show the refinement in a digital amplifier 6 as shown in FIG. 3. The digital amplifier 6 has a comparator 30, which is coupled to the inputs of the amplifier 6 and is clocked via an externally produced clock CLK, for example at 7.8 MHz. The differential outputs of the comparator 30 are respectively followed by two output stages 31, 32, which are driven via a respective gate control circuit 33, 34. The two output stages 31, 32 are each arranged with their load circuit between a first and a second supply potential Vdd, GND.

The output stages 31, 32 are in this case in the form of power inverters, in order to switch the high current which is required in the load 26. The power inverters 31, 32 thus produce a pulse-width modulated signal Vd at their output.

In the analog path 10 in FIG. 3, the outputs of the preamplifier 20 are first of all connected to the matching circuit 14 and, via the series resistors 23, to the differential inputs of the analog amplifier 5. The resistors 23 have a resistance R1. The differential outputs of the analog amplifier 5 are coupled to the outputs 3 via the transformer 13. In this case, the transformer 13 once again has a transformation ratio of 1:6. Furthermore, the resistors 24 with a resistance R2 are arranged between the outputs of the transformer 13 and the inputs of the analog amplifier 5.

The resistor 24 is a component of the feedback path 16, so that the feedback factor is given by:

$$f = \frac{R2}{R1} \qquad (8)$$

A further resistor 25, whose resistance is Rm is provided in the output path of the line driver 1, that is to say in the lines which are provided between the transformer 13 and the output 3. At its output 3, the line driver 1 has a load 26 whose impedance is RL.

The line driver circuit 1 also has a feedback path 28, which taps off the output voltage Vo of the output 3 of the line driver 1 and injects it with positive feedback via resistors 27 into the differential inputs of the preamplifier 20. This thus results in a control loop with positive feedback.

The output resistor 25, the load 26 and the feedback path 28 thus result in a network for a synthesized impedance, with the synthesis factor m of this synthesized impedance being obtained as follows:

$$m = \frac{R_{LOAD}}{2Rm} \qquad (9)$$

The positive feedback of the output voltage in this case makes it possible to reduce the voltage drop across the output transistor.

The line driver 1 shown in FIG. 3 is completely differential, that is to say the analog and digital amplifiers 5, 6 as well as the preamplifier 20 each have two differential inputs and two differential outputs. The preamplifier 20 and the analog amplifier 5 are in the form of inverting amplifiers.

Figure 5:
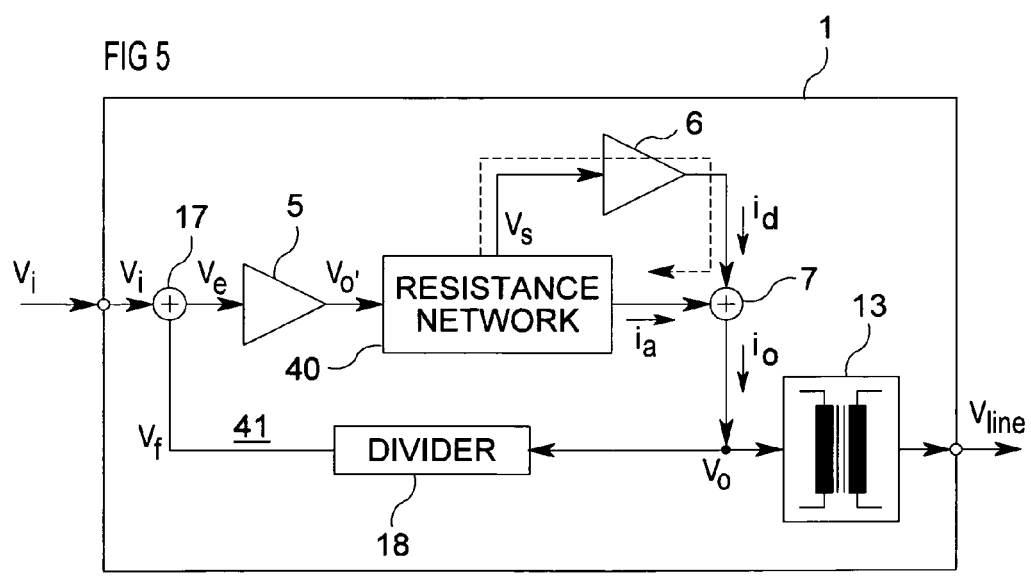
FIG. 5 shows the block diagram of a second line driver circuit according to the invention.

The block diagram in FIG. 5 shows a second line driver arrangement according to the invention. In this case, the line driver 1 has an analog amplifier 5, into which the input signal Vi is injected. The analog amplifier 5 is connected on the output side via a resistance network 40 to the primary side of the transformer 13. The resistance network 40 thus uses the output signal Vo' from the analog amplifier 5 to produce a current signal $i_a$. Furthermore, a digital amplifier 6 is provided between the resistance network 40 and the primary side of the transformer 13. A voltage signal Vs which is tapped off from the resistance network 40 is injected into the digital amplifier 6. On the output side, the digital amplifier 6 produces a current signal $i_d$, which, as a result of superimposition with the current signal $i_a$, leads to the output current signal $i_o$. This is supplied to the primary side of the transformer 13, which uses this to produce the signal $V_{line}$ to be transmitted, on its secondary side.

In addition, a feedback path 41 is provided, via which the output current signal $i_o$ or the voltage signal Vo derived from it, is fed back with a negative mathematical sign. The output voltage signal Vo becomes the feedback signal Vf in the feedback path 41, on which the input signal Vi is superimposed. This results in the error signal Ve, which is injected into the analog amplifier 5.

Thus, in this case, the analog amplifier 5 acts as a buffer amplifier in order to control the digital amplifier 6.

The method of operation of this circuit will be explained briefly in the following text with reference to FIG. 5:

Since the digital amplifier 6 has a pulse-width modulator characteristic, its output current id changes its mathematical sign cyclically. This means that $i_o$ and Vo are also reversed, as a result of which the analog current $i_a$ is also forced—via the closed circuit represented by dashed lines in FIG. 5—to change its mathematical sign, so that the mathematical sign of $V_s$ also changes. However, in consequence, the digital amplifier 6 switches once again, thus closing the circuit.

The self-oscillation is produced in the inner control loop of the digital amplifier 6. This inner control loop is shown by dashed lines in FIG. 5. The current id is generated by the measurement voltage $V_s$. When the digital current id reverses, then the current $i_o$ also reverses, as a result of which the current $i_a$ changes its mathematical sign. $V_s$ thus also changes its mathematical sign, thus resulting in the control loop.

This is a self-oscillating control loop, so that in this case there is no need for any external clock for the digital amplifier 6.

The feedback delay in this control loop thus limits the switching frequency of the self-oscillating control loop. However, as before, this results in inadequate linearity.

In order to optimize the linearity, the line driver 1 advantageously has the additional feedback path 41. This feedback path 41 is used to inject an error signal Ve from the output current signal $i_o$ into the analog amplifier 5. The error signal is thus:

$$Ve = Vi - Vf = Vi - Vo \cdot f \quad (10)$$

where f denotes the feedback factor. The feedback reduces the error signal Ve, thus very largely correcting any scatter in the output signal $i_o$. This is achieved by means of the analog current signal $i_a$, in which any ripple which is superimposed on the digital current signal $i_d$ is compensated for.

The output current signal $i_o$ is obtained, as is shown in FIG. 5, as follows:

$$i_o = i_a + i_d = i_a + (k \cdot i_a) = (1+k) i_a, \quad (11)$$

with the digital current $i_d$ being a multiple k of the analog current $i_a$, by means of the digital amplifier 6. In the situation where k is very large, then:

$$i_o \approx k \cdot i_a = i_d$$

At the same time, this means that the output current $i_o$ corresponds essentially to the current $i_d$ which is produced by the digital amplifier 6 and which has very high efficiency. It also follows from the block diagram in FIG. 5 that:

$$i_d = g_d \cdot Vs, \quad (13)$$

$$Vs = A_R \cdot i_a, \quad (14)$$

with the gain factor k of the digital amplifier 6 being obtained as follows:

$$k = g_d \cdot A_R \quad (15)$$

In order now to increase the efficiency of the line driver according to the invention as shown in FIG. 5, all that is necessary is therefore to increase the current $i_d$ in the digital amplifier 6 with respect to the analog current $i_a$ in the analog amplifier 5.

Figure 6:
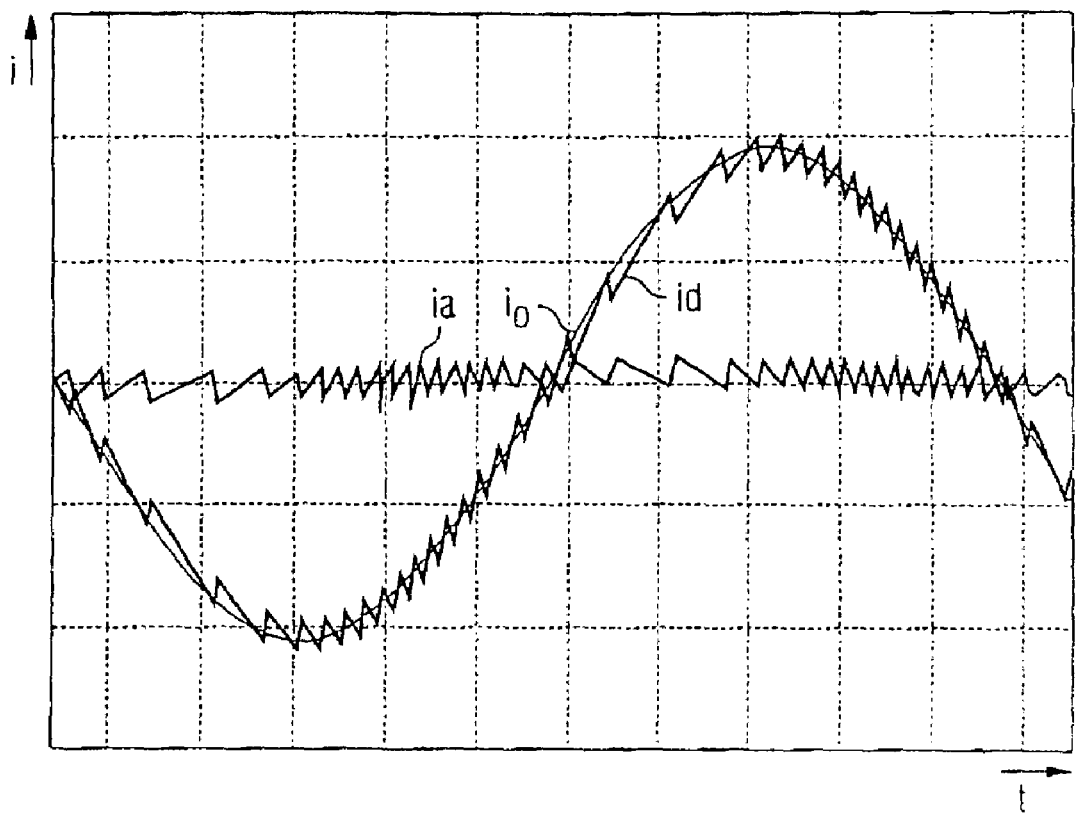
FIG. 6 uses a graph to show the time response of the output currents which are produced by the amplifiers.

FIG. 6 shows a current/time graph, determined by simulation, for a line driver arrangement 1 shown in FIG. 5. Superimposition of the analog current signal $i_a$ and the digital current signal $i_d$ results in the output current signal $i_o$, which now has virtually no harmonics.

Figure 7:
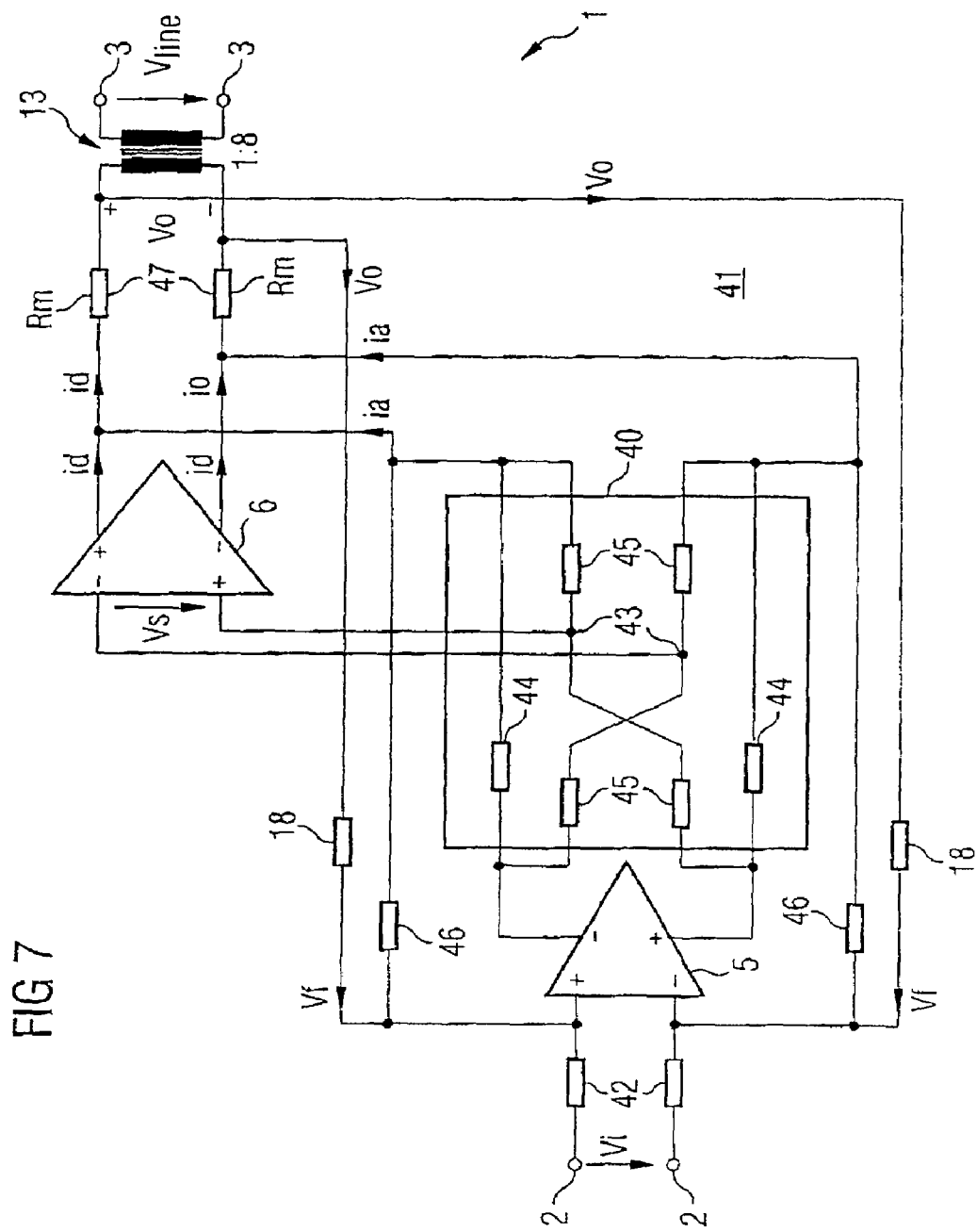
FIG. 7 shows a detailed circuit diagram of a line driver circuit corresponding to that shown in FIG. 5.

FIG. 7 shows a detailed circuit diagram of a line driver according to the invention as shown in FIG. 5. In this case, the line driver 1 is once again completely differential.

The analog amplifier 5, which is once again in the form of an inverting amplifier, is connected via the input resistors 42 to the input 2. The differential outputs of the analog amplifier 5 are coupled via the resistance network 40 to the primary side of the transformer 13. The resistance network 40 has taps 43, via which a voltage signal Vs can be injected into the inputs of the digital amplifier 6. The differential outputs of the digital amplifier 6 are coupled via resistors 47 to the primary side of the transformer 13.

Figure 8:
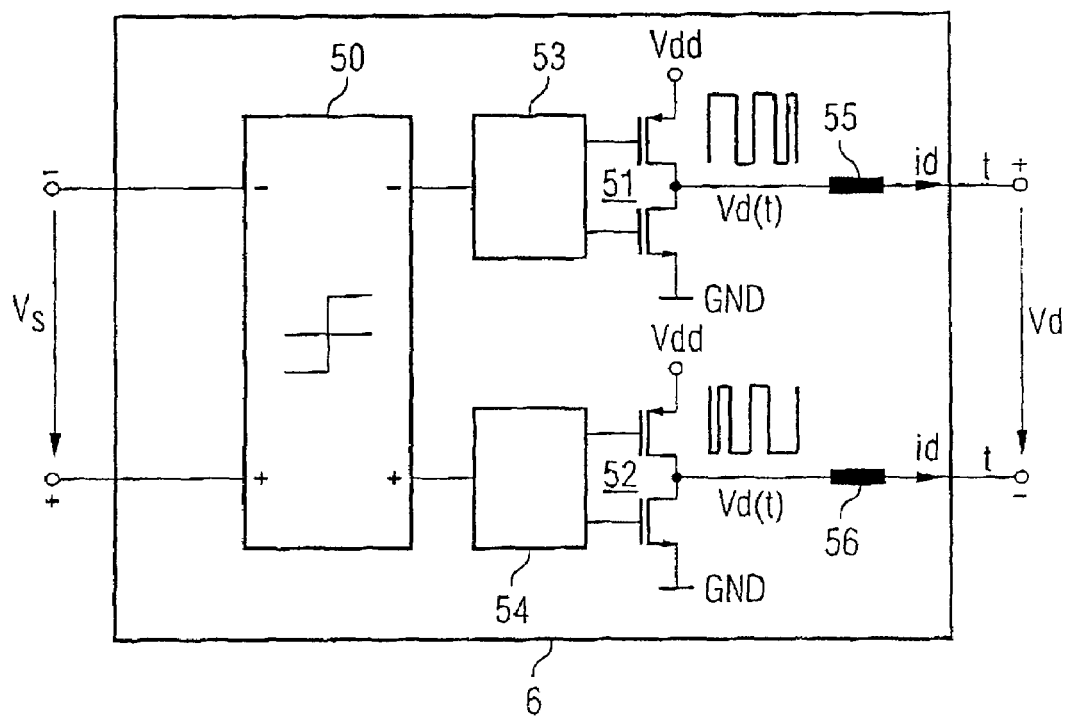
FIG. 8 shows the block diagram of a line driver as shown in FIGS. 5 and 7.

FIG. 8 uses a block diagram to show the configuration of a digital amplifier 6 corresponding to that shown in FIG. 7. In this case, the digital amplifier 6 has a comparator 50, whose inputs are connected to the differential inputs of the digital amplifier 6. The two outputs of the comparator 50 are connected to a respective output stage 51, 52. The output stages 51, 52 in this case have gate control circuits 53, 54 for driving them and for driving the respective transistors in the output stages 51, 52 connected upstream of them. These output stages 51, 52 are in the form of power inverters. An output signal Vd can be tapped off at the center taps of the respective output stages 51, 52 and can be supplied via the inductances 55, 56 to the differential outputs of the digital amplifier 6. The inductances 55, 56 use the voltage signals Vd which can be tapped off at the center taps of the output stages 51, 52 to produce a current signal $i_d$, in each case. Furthermore, these inductances 55, 56 act, so to speak, as filters, with their inductance value being very important for the stability of and for compensation of the output current.

The resistance network 40 comprises two measurement resistances 44, which are arranged in parallel with one another with respect to the differential outputs of the analog amplifier 5 and are coupled on both sides via the resistances 45 to one another, crossed over. Two of these resistances 45, which are coupled and crossed over, in each case form a voltage divider in this case, that includes center taps 43 at which the input potential Vs for the digital amplifier 6 is tapped off. The outputs of the resistance network 40 are, as already mentioned, coupled on the one hand to the primary side of the transformer 13 and on the other hand via a resistor 46 to the inputs of the analog amplifier 5. The resistors 46 in this case once again define a feedback for the analog amplifier 5.

The output voltage from the analog amplifier 5 is thus measured via the measurement resistor 44, and is thus used to drive the digital amplifier 6. This highly advantageous arrangement means that there is no need to further amplify the output voltage signal from the analog amplifier 5 for injection into the digital amplifier 6. All that is necessary is to be sure that the measurement resistance 44 is chosen to be as small as possible, in order to keep the voltage drop, and hence losses across the measurement resistance 44 as small as possible. The resistances 45 in the voltage divider should in contrast be designed to be very much greater than the measurement resistance 44, so that they carry only a comparatively small current.

The voltage Vo which is dropped across the primary side of the transformer 13 is transformed to the secondary side with a transformation ratio of 1:8 in the present exemplary embodiment, so that the signal $V_{line}$ to be transmitted can be tapped off at the output 3 of the line driver.

A further very important relationship results from the switching frequency. The switching frequency $f_{sw}$ for a line driver circuit 1 as shown in FIG. 7 is as follows:

$$f_{SW} \propto \frac{1}{L \cdot V_T \cdot \Delta t'} \quad (16)$$

where L is the value of the inductances 55, 56, $V_T$ is the threshold voltage of the comparator 50 for the digital amplifier 6, and $\Delta t$ is the delay in the control loop.

However, equation (16) applies only to an inductance value in a range in which it is possible to sufficiently well model the current in the digital amplifier 6. However, as already mentioned above, the delay $\Delta t$ in the digital control loop limits, so to speak, the switching frequency $f_{SW}$. For this situation, the switching frequency $f_{SW}$ is determined using the following equation:

$$f_{SW} \propto \frac{d i_d(t)}{dt} = \frac{V_{DD} - V_D(t)}{L} \quad (17)$$

where $V_{DD}$ denotes the supply voltage for the digital amplifier 6, and $V_D(t)$ denotes the output signal for the digital amplifier 6.

Equation (17) thus indicates the frequency range in which the entire line driver arrangement 1 operates correctly, that is to say the switching frequency $f_{SW}$ is directly proportional to the rate of change of the digital current $i_d$, and is thus inversely proportional to the signal amplitude. This knowledge can be used to find the optimum switching frequency for the line driver 1. Furthermore, equation (17) allows the power consumption of the line driver arrangement 1 to be optimally matched to the given conditions.

The present invention has been described above on the basis of a line driver for an ADSL data transmission device. However, the invention is not restricted exclusively to ADSL systems, but can be used highly advantageously with line drivers for any desired xDSL systems. Furthermore, the invention is also not restricted to specific line driver types and classes, but, within the scope of the invention, may, of course, be used for any desired line drivers in which the requirement for great linearity with scatter and losses which are as low as possible at the same time is a primary factor.

Thus, in summary, it can be stated that the arrangement according to the invention makes it possible to provide a line driver in a highly elegant but very effective manner, with both low scatter and high efficiency.

The present invention has been illustrated on the basis of the above description in such a way as to explain the principle of the method according to the invention and its practical application as well as possible, although the invention may also, of course, be produced in many different variants, if suitably modified.

The invention claimed is:

1. A line driver for driving signals via at least one subscriber line, comprising:
   an input for injecting an input signal and an output at which a signal which is to be driven via the subscriber line is tapped off;
   a digital amplifier arranged in a digital path, which digital amplifier produces a digital signal on the output side from one of the input signal or a signal derived from the input signal;
   an analog amplifier arranged in an analog path, which analog amplifier produces an analog signal on the output side from one of the input signal or a signal derived from the input signal;
   a feedback path, via which the signal which results from the superimposition of the analog and digital signals is fed back with negative feedback to the input of the analog amplifier; and
   a matching circuit connected upstream of the analog amplifier in the analog path and carrying out at least one of phase matching or amplitude matching of the input signal to the output signal;
   wherein the analog path and the digital path are arranged in parallel with one another,
   wherein the outputs of the amplifiers are coupled such that the signal to be driven results from superimposition of the analog signal and the digital signal, and
   wherein the gain of the analog amplifier is matched to the gain of the digital amplifier such that at least one of the scatter or overshoot on the digital signal is at least reduced after the superimposition.

2. A line driver for driving signals via at least one subscriber line, comprising:
   an input for injecting an input signal and an output at which a signal which is to be driven via the subscriber line is tapped off;
   a digital amplifier arranged in a digital path, which digital amplifier produces a digital signal on the output side from one of the input signal or a signal derived from the input signal;
   an analog amplifier arranged in an analog path, which analog amplifier produces an analog signal on the output side from one of the input signal or a signal derived from the input signal; and
   a feedback path, via which the signal which results from the superimposition of the analog and digital signals is fed back with negative feedback to the input of the analog amplifier;
   wherein the analog path and the digital path are arranged in parallel with one another,
   wherein the outputs of the amplifiers are coupled such that the signal to be driven results from superimposition of the analog signal and the digital signal,
   wherein the gain of the analog amplifier is matched to the gain of the digital amplifier such that at least one of the scatter or overshoot on the digital signal is at least reduced after the superimposition, and
   wherein the analog amplifier is followed by a resistance network, at whose output an analog current is tapped off, and wherein a potential which is tapped off from the resistance network is injected into the digital amplifier to produce on the output side a digital current which is superimposed on the analog current.

3. The line driver of claim 2, wherein the resistance network has at least one measurement resistance via which the analog current is passed, and has a voltage divider across which the potential which is injected into the digital amplifier is tapped off.

4. The line driver of claim 3, wherein the resistance value of the measurement resistance is very much less than the resistance values of the voltage divider resistances.

5. A line driver for driving signals via at least one subscriber line, comprising:
   an input for injecting an input signal and an output at which a signal which is to be driven via the subscriber line is tapped off;
   a digital amplifier, which produces a digital signal on the output side from one of the input signal or a signal derived from the input signal;
   an analog amplifier, which produces an analog signal on the output side from one of the input signal or a signal derived from the input signal;
   a feedback path, via which the signal which results from the superimposition of the analog and digital signals is fed back with negative feedback to the input of the analog amplifier; and
   a load which is in the form of a transformer provided at the output of the line driver;
   wherein the outputs of the amplifiers are coupled such that the signal to be driven results from superimposition of the analog signal and the digital signal, and
   wherein the gain of the analog amplifier is matched to the gain of the digital amplifier such that at least one of the scatter or overshoot on the digital signal is at least reduced after the superimposition.

6. The line driver of claim 5, wherein the transformer is designed such that its bandwidth matches the bandwidth of the signal to be driven.

7. The line driver of claim 5, wherein the transformer has a very high transformation ratio in the region of at least 1:4 between the primary and the secondary sides.

8. The line driver of claim 6 and further comprising a further transformer arranged in the analog path following the analog amplifier.

9. The line driver of claim 8, wherein the further transformer has a lower transformation ratio than the first.

10. The line driver of claim 9, and further comprising a divider provided in the feedback path having a feedback factor by which the fed-back signal is divided.

11. The line driver of claim 10, wherein the feedback factor (f) corresponds to the transformation ratio of the transformer which follows the digital amplifier.

12. The line driver of claim 5, further comprising a further feedback device which feeds back the output signal with positive feedback to the input, with the elements of the control loop which results from this being designed such that the impedance of the line driver-is variable.

13. The line driver of claim 12, wherein the variable impedance has a synthesis factor (m) which is proportional to the ratio of the load to an output resistance.

14. The line driver of claim 5, and further comprising a control device controlling the amplifiers.

15. The line driver of claim 5, wherein the analog amplifier is in the form of an inverting amplifier.

16. The line driver of claim 14, wherein the digital amplifier has a comparator coupled to the input of the digital amplifier followed, as the output stage by a power inverter.

17. A line driver for driving signals via at least one subscriber line, comprising:
an input for injecting an input signal and an output at which a signal which is to be driven via the subscriber line is tapped off;
a digital amplifier arranged in a digital path, which digital amplifier produces a digital signal on the output side from one of the input signal or a signal derived from the input signal;
an analog amplifier arranged in an analog path, which analog amplifier produces an analog signal on the output side from one of the input signal or a signal derived from the input signal; and
a feedback path, via which the signal which results from the superimposition of the analog and digital signals is fed back with negative feedback to the input of the analog amplifier;
wherein the analog path and the digital path are arranged in parallel with one another,
wherein the outputs of the amplifiers are coupled such that the signal to be driven results from superimposition of the analog signal and the digital signal,
wherein the gain of the analog amplifier is matched to the gain of the digital amplifier such that at least one of the scatter or overshoot on the digital signal is at least reduced after the superimposition, and
wherein the digital amplifier has a PWM characteristic, such that its digital output signals are pulse-width modulated.

18. A line driver for driving signals via at least one subscriber line, comprising:
an input for injecting an input signal and an output at which a signal which is to be driven via the subscriber line is tapped off;
a digital amplifier arranged in a digital path, which digital amplifier produces a digital signal on the output side from one of the input signal or a signal derived from the input signal;
an analog amplifier arranged in an analog path, which analog amplifier produces an analog signal on the output side from one of the input signal or a signal derived from the input signal; and
a feedback path, via which the signal which results from the superimposition of the analog and digital signals is fed back with negative feedback to the input of the analog amplifier;
wherein the analog path and the digital path are arranged in parallel with one another,
wherein the outputs of the amplifiers are coupled such that the signal to be driven results from superimposition of the analog signal and the digital signal,
wherein the gain of the analog amplifier is matched to the gain of the digital amplifier such that at least one of the scatter or overshoot on the digital signal is at least reduced after the superimposition, and
wherein the line driver is in the form of an ADSL driver circuit.

19. The line driver of claim 17, wherein circuit means are provided, by means of which a switching frequency is matched to the amplitude of the output signal.

20. The line driver of claim 5, wherein the signals to be driven are speech signals or data signals.

21. The line driver of claim 5, wherein the line driver is completely differential.

22. The line driver of claim 5, wherein at least one transformer has a very high transformation ratio in the region of more than 1:6, between the primary and the secondary sides.

23. The line driver of claim 8, wherein the further transformer has a transformation ratio of about 1:1.

24. A line driver for driving signals via a subscriber line, comprising:
an input for injecting an input signal;
an output at which a signal which is to be driven via the subscriber line is tapped off;
a digital path between the input and output including a digital amplifier which produces a pulse-width-modulated (PWM) signal on an output side of the digital path from a signal derived from the input signal;
an analog path between the input and output including an analog amplifier which produces an analog signal on an output side of the analog path from a signal derived from the input signal;
wherein the digital path and analog paths are arranged in parallel with one another and are coupled at their output sides such that the signal to be driven results from superimposition of the analog signal and the PWM signal; and
wherein the gain of the analog amplifier is matched to the gain of the digital amplifier such that at least one of the scatter or overshoot on the PWM signal is at least reduced after the superimposition.

25. The apparatus of claim 24 and further comprising a feedback path via which the signal which results from the superimposition of the analog and PWM signals is fed back with negative feedback to an input of the analog path.

* * * * *